United States Patent
Stobie et al.

(10) Patent No.: US 10,587,826 B2
(45) Date of Patent: Mar. 10, 2020

(54) EVENT-DRIVEN SEEKER

(71) Applicant: BAE SYSTEMS Information and Electronic Systems Integration Inc., Nashua, NH (US)

(72) Inventors: James A. Stobie, Westford, MA (US); Michael J. Choiniere, Merrimack, NH (US); R. Daniel McGrath, Lexington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 321 days.

(21) Appl. No.: 15/851,223

(22) Filed: Dec. 21, 2017

(65) Prior Publication Data
US 2019/0199945 A1 Jun. 27, 2019

(51) Int. Cl.
*H04N 5/345* (2011.01)
*F41G 7/22* (2006.01)
(Continued)

(52) U.S. Cl.
CPC ............ *H04N 5/345* (2013.01); *F41G 7/226* (2013.01); *F41G 7/2266* (2013.01);
(Continued)

(58) Field of Classification Search
CPC .......... H04N 5/345; H04N 5/33; F41G 7/226; F41G 7/2293; F41G 7/2266; F41G 7/2273
See application file for complete search history.

(56) References Cited

U.S. PATENT DOCUMENTS

| | | | | |
|---|---|---|---|---|
| 5,129,595 | A | 7/1992 | Thiede et al. | |
| 5,309,230 | A * | 5/1994 | Blondel | H04N 5/33 348/164 |

(Continued)

FOREIGN PATENT DOCUMENTS

WO 2007041728 A2 4/2007

OTHER PUBLICATIONS

J. F. Ralph et al., "Semi-Active Guidance using Event Driven Tracking"; IEEE Publication 978-09824438-2-8/11/$26.00; copyright in the year 2011; IEEE; Piscataway, NJ, USA. (Year: 2011).*
(Continued)

*Primary Examiner* — Bernarr E Gregory
(74) *Attorney, Agent, or Firm* — Finch & Maloney PLLC (57) ABSTRACT

A seeker includes a detection array having at least 2500 sensing pixels arranged in rows by row request lines and in columns by column request lines. At least one pixel includes an electromagnetic radiation sensor to trigger the pixel in response to sensing a triggering quantity of electromagnetic radiation, a row request circuit to send a row request after the pixel triggers, and a column request circuit to send a column request after the pixel triggers. The seeker further includes a row receiver to receive the row requests, a column receiver to receive the column requests, and a sequencer to receive, for each triggering pixel, the row of the row request and the column of the column request, and to generate an event including the received row and column of the pixel. The seeker also includes a time stamper to generate a time stamp for the generated event.

20 Claims, 5 Drawing Sheets

(51) Int. Cl.
*H04N 5/33* (2006.01)
*F41G 7/00* (2006.01)

(52) U.S. Cl.
CPC ......... *F41G 7/2273* (2013.01); *F41G 7/2293* (2013.01); *H04N 5/33* (2013.01)

(56) References Cited

U.S. PATENT DOCUMENTS

| | | | | |
|---|---|---|---|---|
| 5,635,705 | A * | 6/1997 | Saunders | G01D 1/16 250/208.1 |
| 7,180,046 | B2 * | 2/2007 | Tinkler | H04N 5/335 250/214 R |
| 7,521,682 | B1 * | 4/2009 | Holland | G01T 1/17 250/370.01 |
| 8,569,706 | B2 * | 10/2013 | Thiruvenkadam | A61B 6/037 250/363.03 |
| 2003/0057371 | A1 * | 3/2003 | Wood | H04N 5/33 250/330 |
| 2003/0226973 | A1 * | 12/2003 | Beusch | G06F 3/05 250/370.09 |
| 2004/0026623 | A1 * | 2/2004 | Doty | H04N 5/3454 250/370.09 |
| 2008/0284884 | A1 * | 11/2008 | Makino | H04N 5/345 348/296 |
| 2012/0019698 | A1 * | 1/2012 | Ui | H04N 5/345 348/308 |
| 2012/0105661 | A1 * | 5/2012 | Wong | H04N 5/345 348/222.1 |
| 2014/0362269 | A1 * | 12/2014 | Omori | H04N 5/345 348/308 |
| 2016/0323530 | A1 | 11/2016 | Dehaene | |

OTHER PUBLICATIONS

International Search Report, PCT/US18/66140, 11 pages, dated Jul. 26, 2019.

* cited by examiner

500  Event-Driven Seeking Method

Start

↓

For each pixel, trigger the pixel in response to the pixel sensing a triggering quantity of electromagnetic radiation
510

↓

For each triggering pixel, send row request through corresponding row request line and column request through corresponding column request line
520

↓

For each row having at least one triggering pixel, receive row request from the at least one triggering pixel through corresponding row request line
530

↓

For each received row request from at least one triggering pixel, receive column request through corresponding column request line for each column of the at least one triggering pixel
540

↓

For each triggering pixel, generate event including row of corresponding row request line of row request of pixel, column of corresponding column request line of column request of pixel, and time stamp corresponding to triggering of pixel
550

↓

End

EVENT-DRIVEN SEEKER

FIELD OF THE DISCLOSURE

This disclosure relates to an event-driven seeker.

BACKGROUND

A seeker is part of a self-guided object (such as a munition). For example, a semi-active laser (SAL) seeker can receive reflected laser signals (e.g., pulses) from a potential target, decode the pulses into coded streams, and provide navigation information to a guidance system of the munition to help direct the munition to an intended target. There are a number of non-trivial issues associated with a seeker design.

BRIEF DESCRIPTION OF THE DRAWINGS

Features of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those in light of the present disclosure.

DETAILED DESCRIPTION

According to one or more embodiments of the present disclosure, reflected laser beam detection is combined with accurate temporal information to provide for an event-driven seeker. The seeker provides functions such as pulse train decoding, e.g., from pulse repetition frequency (PRF) or pulse interval modulation (PIM) encoded laser reflections, and counter measure detection and suppression. In various embodiments, events (such as laser pulses or their reflections) are detected asynchronously on a row or column basis of a two-dimensional sensor array. The events are time stamped, for example, with a resettable counter that increments in units of time, such as 10 nanoseconds (ns), calibrated off a reference time. This facilitates event-driven two-dimensional readout of a sensor array that reports both location (e.g., azimuth and elevation) and time of a pixel event in nearly real-time. The pixel can be reset to receive another laser pulse within, for example, 200 ns, which aids in counter countermeasures (CCM), such as detecting and suppressing countermeasures that attempt to disable the seeker.

In one embodiment, a seeker is provided. The seeker includes a detection array having at least 2500 sensing pixels arranged in rows by row request lines and in columns by column request lines. Each pixel can have a simplified design, such as including an electromagnetic radiation sensor configured to trigger the pixel in response to sensing a triggering quantity of electromagnetic radiation of the desired wavelength or frequency. Each pixel can also include a row request circuit to send a row request through the corresponding row request line after the pixel triggers, and a column request circuit to send a column request through the corresponding column request line after the pixel triggers. The seeker further includes a row receiver to receive, for each row having at least one triggering pixel, the row request from the at least one triggering pixel through the corresponding row request line. Similarly, the seeker further includes a column receiver to receive, for each column having one or more triggering pixels, the column request from the one or more triggering pixels through the corresponding column request line. In addition, the seeker includes a sequencer to receive, for each triggering pixel, the row of the row request from the row receiver and the column of the column request from the column receiver, and to generate an event including the received row and column of the pixel. Further, the seeker includes a time stamper to generate a time stamp for each generated event.

General Overview

As mentioned earlier, there are a number of non-trivial issues associated with a seeker design. For instance, other sensing pixel arrays are usually raster scanned (pixel-by-pixel) in frames (e.g., row-by-row, and within each row, column-by-column for each frame). These raster scanners often sense imagery as captured by the individual pixels, scanning each of the pixels once each frame. However, for a pixel array of say, 200 rows and 200 columns (e.g., 40,000 pixels) or larger, all 40,000 pixels must be scanned each frame. At example frame rates of 100 hertz (Hz) or even 200 Hz, this is at least 5 milliseconds for processing each pixel, which is far too slow for real-time processing of laser designator codes (that can need temporal resolution of less than 500 ns). Even with increasing the frame rate by realistic amounts or decreasing the number of pixels, it is not possible to raster scan thousands of pixels (such as 2500 pixels in a 50×50 configuration, or even half that many pixels) using raster scanning with current frame rates and imaging technology and achieve response time in the tens of ns or better. Accordingly, such techniques lose precision in temporal tracking of laser designator tracking because of the relatively low frame rates, which makes decoding pulse trains problematic. Further, most of the frame based imagery does not contain laser spot information, which further increases processing power requirements for the system.

Thus, and in accordance with various embodiments of the present disclosure, an event-driven readout is provided, with pixels specially designed to detect laser pulse radiation of interest. The event driven readout performs the laser spot culling process up front at the image plane, allowing an event to be captured by high-speed row and column detectors. These row and column detectors generate a corresponding row and column address (e.g., X-Y coordinates) of a pixel experiencing an event, such as a pixel triggering when sufficient laser pulse radiation has been received. The readout can send as little as the X-Y coordinates and a time stamp (e.g., a time counter based from a reference time), which can be a relatively low bandwidth serial data stream sent to a tracking processor (or field-programmable gate array (FPGA) or other such processing device). The tracking processor can take such event data over time and characterize the pattern of laser pulses, such as laser codes and corresponding locations, which can then be delivered to a guidance system. The guidance system can use the laser code and location data to direct a maneuvering object (such as a smart munition) to an intended destination (such as a laser-designated target).

In some other embodiments, devices provide electromagnetic radiation detection (such as laser detection, e.g., infrared (IR) laser detection) and direction of arrival in azimuth and elevation coordinates (such as row and column). This can be used, for example, for laser spot detection, laser warning receivers, autonomous vehicles with three-dimensional (3-D) lidar, to name a few.

Architecture and Methodology

Figure 1:
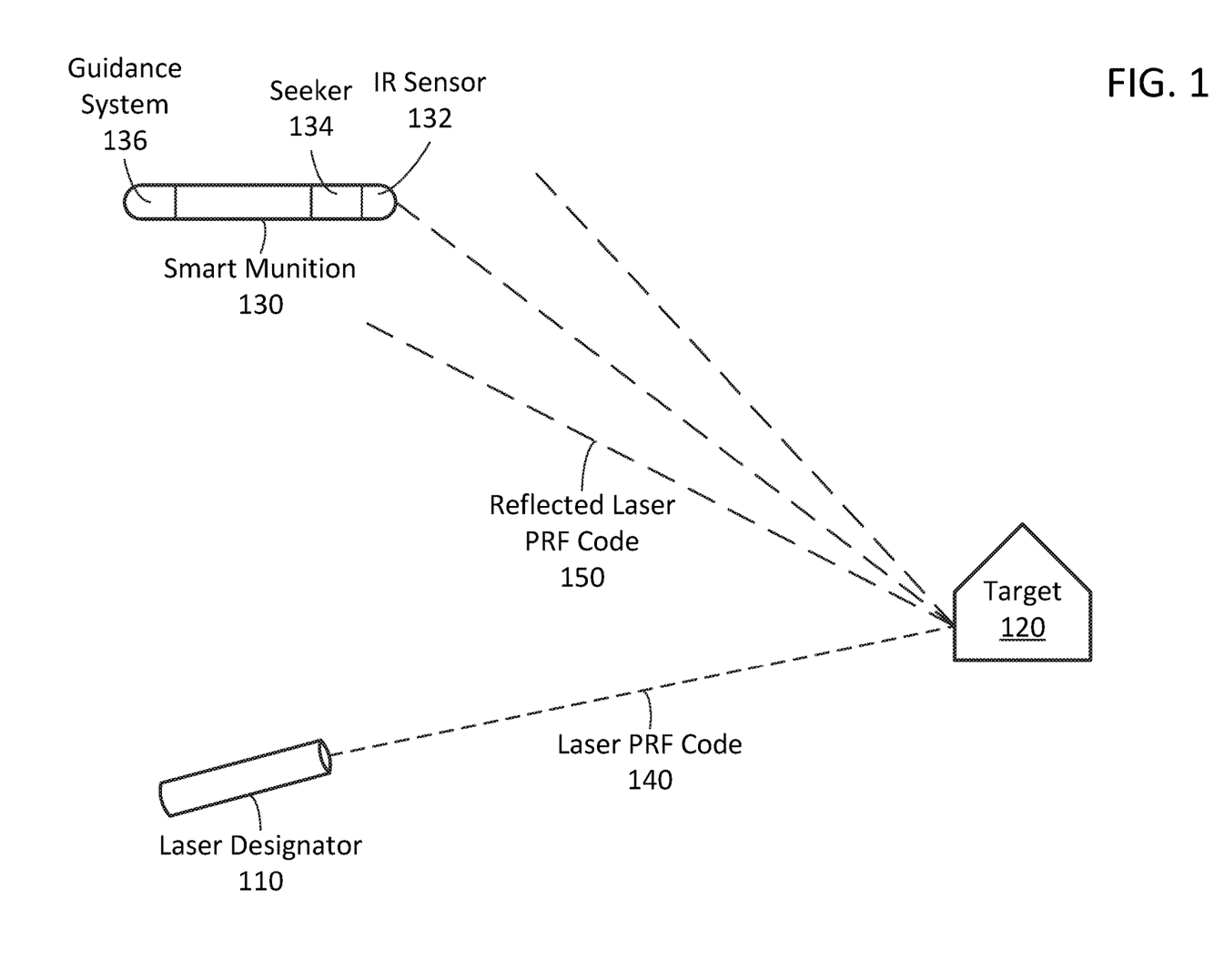
FIG. 1 is a. schematic diagram of an example environment for deploying a seeker guiding a smart munition to a target as directed by a laser designator, according to an embodiment of the present disclosure.

FIG. 1 is a. schematic diagram of an example environment for deploying a seeker 134 guiding a smart munition 130 to a target 120 as directed by a laser designator 110, according to an embodiment of the present disclosure. The laser designator 110, for example, can be a human-deployed instrument, such as a person aiming the laser designator 110 at the target 120, or a vehicle deployed instrument, such as a targeting system from a land vehicle, ship, or aircraft. The laser designator 110, for example, can illuminate or designate the target 120 with an IR laser beam, such as a 1064 nanometer (nm) wavelength laser beam as emitted by a neodymium-doped yttrium aluminum garget (e.g., Nd:$Y_3Al_5O_{12}$ or Nd:YAG) laser.

The laser beam can encode a signal 140, such as a PRF or PIM encoded signal, that a guidance system 136 (e.g., processor and controls, such as fins, attitude adjusters, and the like) uses to guide the smart munition 130 to the target 120 under the control of the seeker 134. For example, the guidance system 136 can direct the trajectory of the smart munition 130 to home in on a reflected laser spot by adjusting the direction of the munition 130 to center the reflected laser spot to the middle of a sensor pixel array of the seeker 134. By using an encoded signal 140 known only to the guidance system 136 and to the laser designator 110, countermeasures are relatively ineffective against the smart munition 130, and the likelihood of targeting an unintended target is considerably reduced.

The intended target 120 can be, for example, a vehicle or structure (or another objective to be neutralized by the smart munition 130). By designating the target 120 with the laser designator 110 with an encoded IR laser beam 140, the target 120 will be unaware that the smart munition 130 is specifically targeting (and having an active guidance system assist in delivering the smart munition 130 to) the target 120. The smart munition 130 can be any projectile (e.g., rocket, missile, bomb, to name a few) capable of altering its course after deploying as directed by the guidance system 136 in response to sensing the reflected laser PRF code 150 off the target 120 (for instance, by an IR sensor 132 at the front of the smart munition 130).

For example, in one embodiment and deployment environment, the laser designator 110 is configured to deliver a pulsed laser beam of 100 millijoule (mJ) per pulse for a distance of between 1 and 10 kilometers (km), e.g., 5 km, to the target 120. The target is assumed to reflect 10% of the laser beam pulse. The reflected laser beam pulse is then assumed to travel between 2 and 5 km to reach the smart munition 130 and associated IR sensor 132. If the visibility or atmosphere is assumed to be about 23 km, then approximately 17.8 femtojoule (fJ) of reflected laser energy from the laser pulse reaches the IR sensor 132 when the IR sensor 132 is 5 km away from the target 120. This generates approximately 270 millivolt (mV) of signal at the detector in each pixel of the IR sensor 132 directed to receive a signal from the target 120. This generated signal can be amplified (for example, three-fold) prior to comparing the signal with a threshold signal level at a comparator in the pixel circuit.

Accordingly, in this embodiment and environment, an example threshold amount of received reflected laser energy can be 0.5 fJ, which results in a 40 mV signal level (preamplified) or 120 mV (amplified) signal level at the comparator. The difference between the 810 mV "normal" signal and the 120 mV threshold signal can account for weaker reflected signals due to various degrading effects such as greater distances (especially of the smart munition 130 to the target 120), less reflectivity of the target 120, worse visibility or atmospheric interference, and the like.

Figure 2:
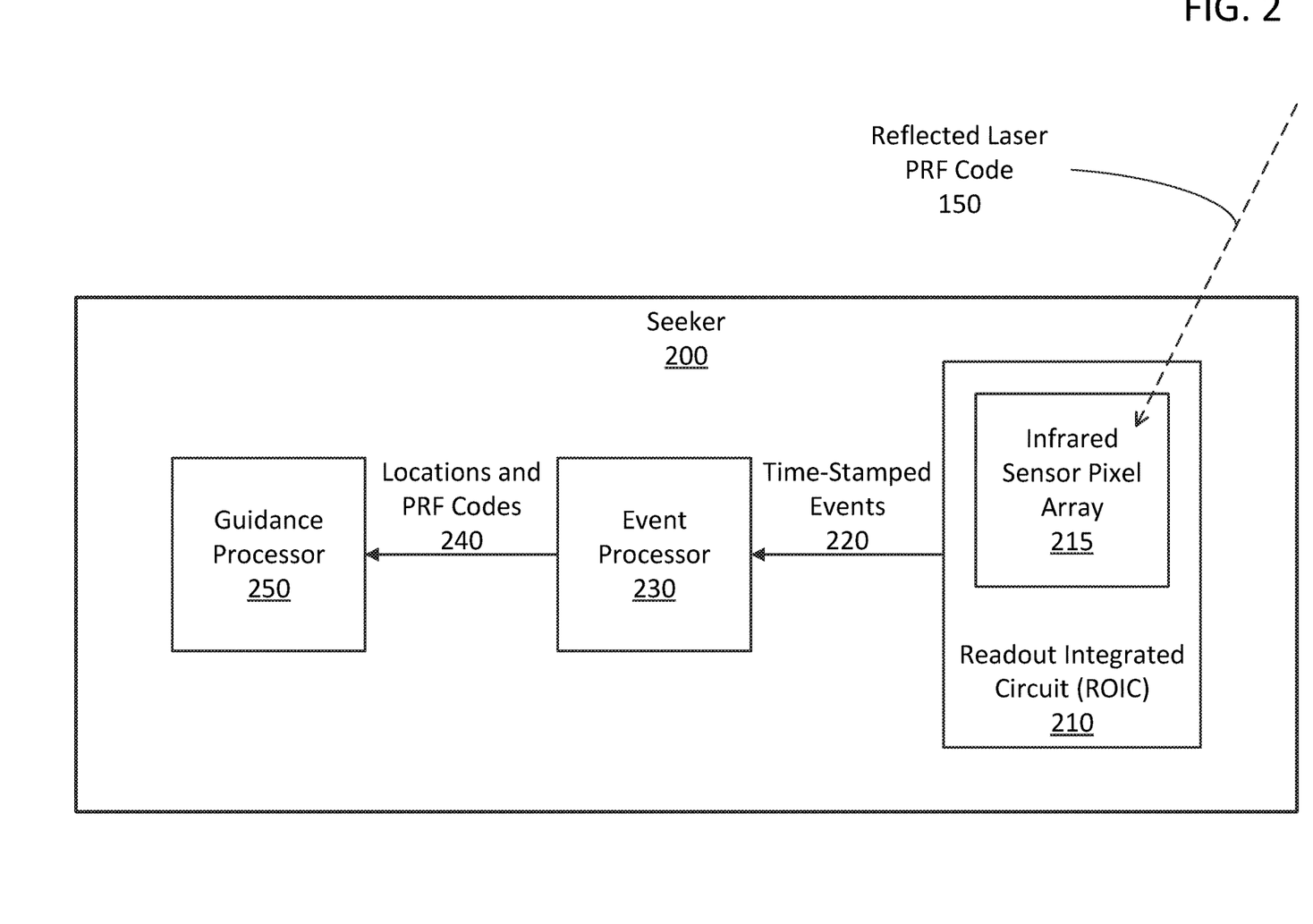
FIG. 2 is a block diagram of an example seeker, according to an embodiment of the present disclosure.

FIG. 2 is a block diagram of an example seeker 200, according to an embodiment of the present disclosure. In the seeker 200, reflected (infrared) laser PRF code 150 is sensed by an infrared (IR) two-dimensional (2-D, such as azimuth and elevation) sensor pixel array 215, which is part of a readout integrated circuit (ROIC) 210. For example, the sensor pixel array 215 may be a 200×200 pixel array of infrared sensor pixels, each capable of detecting infrared radiation similar to that used by IR laser designators (such as a particular wavelength, e.g., 1064 nm). In some embodiments, the pixels are capable of sensing other signals (e.g., different wavelengths or strengths of electromagnetic radiation besides laser designator signals). In some embodiments, the pixels are more simplified, being configured to sense a triggering level of electromagnetic radiation (e.g., a subset range of the IR spectrum, such as a particular wavelength of interest) and output a binary state (e.g., triggered or not triggered). In some embodiments, some of the pixels sense the laser designator frequencies, while other pixels sense different signals.

As the radiation sensing pixels in the pixel array 215 sense the IR radiation, events are generated by the ROIC 210, one event per triggering pixel. In one example, the location and identification of the triggering pixel, together with a time stamp of the triggering, is utilized. These time-stamped events 220 are sent to an event processor 230, which can model the events 220 over time to discern encoded IR laser signals received by particular pixels or groups of adjacent pixels. The decoded signals (e.g., PRF codes) and their corresponding locations 240 in the pixel array 215 are sent to a guidance processor 250 (or custom processing circuit) for helping guide a corresponding projectile or other munition to an intended (designated) target.

For example, the guidance processor 250 can determine adjustments in the path of the projectile to center the targeted laser spot in the middle of the pixel array 215 (or other appropriate location for delivering the munition to the intended target). It should be noted that the seeker 200 is just an example. For instance, in other embodiments, the guidance processor 250 may be part of an external system, such as a guidance system for a smart munition. In a further example, the pixel array 215 also provides imaging data that can be used with the laser guiding in order to provide a more accurate target acquisition.

The size of the sensor pixel array 215 is not limited to 200×200 pixels. For example, in one embodiment, the pixel array may be larger (such as 250×250) or smaller (such as 150×150). In another embodiment, the pixel array is 100× 100. In yet another embodiment, the pixel array is 50×50 (2500 pixels). The shape can be optimized for the intended delivery vehicle (e.g., smart munition) and be, for example, square, round, oval, rectangular, or the like. In still other embodiments, the array can take on different 2-D shapes or patterns, such as a diamond or circle, possibly with different numbers of pixels per row or column (to account for the different shape). For instance, such shape changes can reduce the total number of pixels by half compared to a square shape (e.g., as few as 1250 pixels). Reducing the pixel count below, say, 1250 pixels, starts diminishing the beneficial effects of the asynchronous event-driven architecture of various embodiments of the present disclosure. The pixels can resolve, for example, in angular resolution, with example pixel pitches between 15 and 30 micrometers (μm). In some cases, the shape or pattern of pixels can be more appropriately be indexed by each of the two dimensions (rather than strictly rows and columns).

Figure 3:
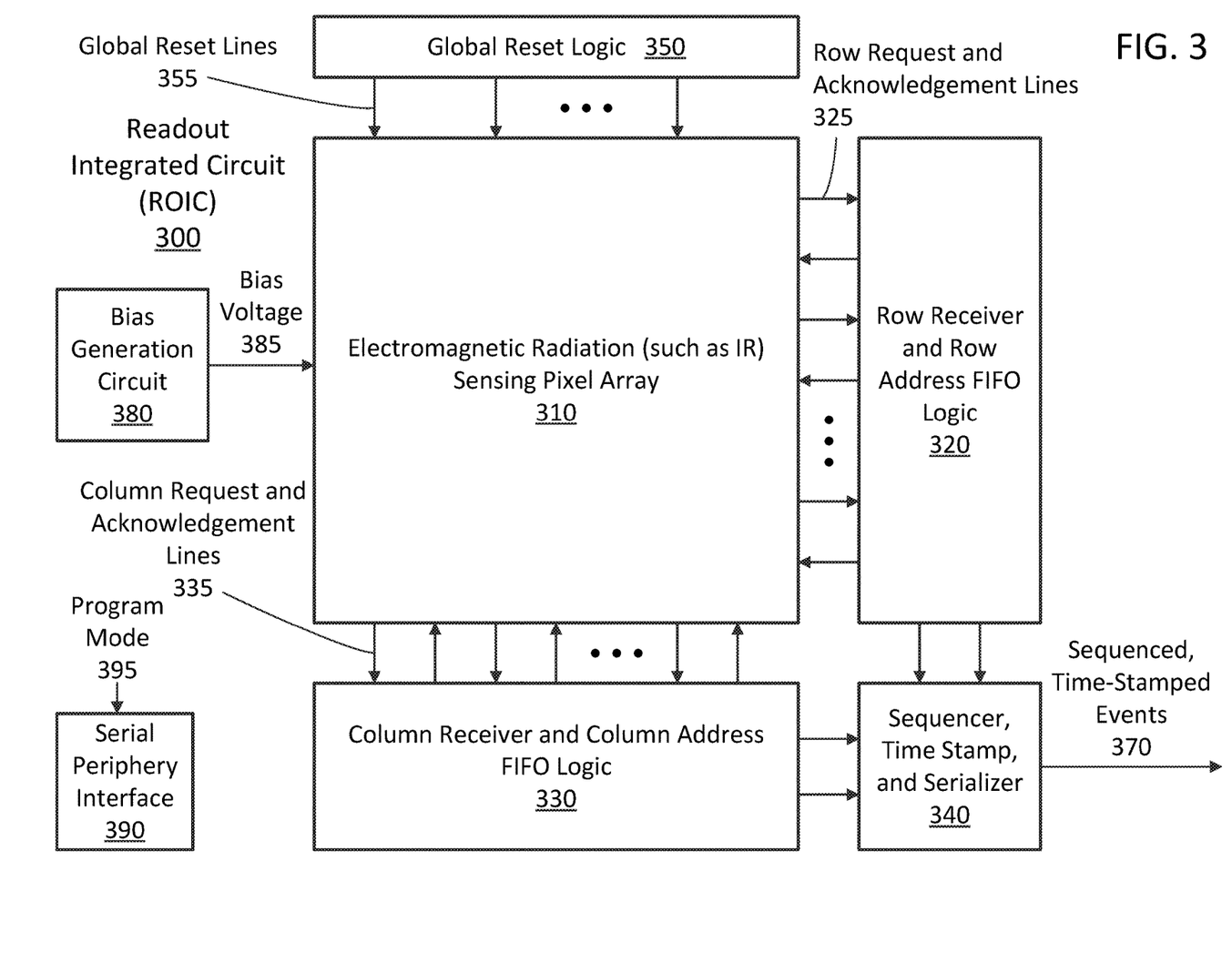
FIG. 3 is a block diagram of an example readout integrated circuit (ROIC), according to an embodiment of the present disclosure.

FIG. 3 is a block diagram of an example readout integrated circuit (ROIC) 300, according to an embodiment of the present disclosure. The ROIC 300 includes an electromagnetic radiation (such as IR radiation) sensing pixel array 310, a row receiver and row address first-in first-out (FIFO) logic circuit 320, a column receiver and column address FIFO logic circuit 330, a sequencer, time stamper, and serializer circuit 340, and a global reset logic circuit 350. The pixels in the pixel array 310 can be, for example, simple threshold-detecting pixels, sensing portions of the IR spectrum used by laser designators). In other embodiments, the pixels may sense different spectrums (such as visible light spectrums). The pixels can be arranged in rows and columns, and communicate via corresponding row request and acknowledgement lines 325 and column request and acknowledgement lines 335. For example, the pixels are arranged in rows by the row request and acknowledgement lines 325, and in columns by the column request acknowledgement lines 335, with one row request line and one row acknowledgement line per row of pixels, and one column request line and one column acknowledgement line per column of pixels.

Each pixel is uniquely addressed by a corresponding pair of row request and column lines as well as a corresponding pair of row acknowledgement and column acknowledgement lines. Each of the row request and row acknowledgement lines is commonly coupled to the pixels in the corresponding row, while each of the column request and column acknowledgement lines is commonly coupled to the pixels in the corresponding column. The pixels can be concurrently (e.g., simultaneously) reset through the global reset logic circuit 350, which can send a global reset command to the pixels through global reset lines 355 (e.g., each commonly coupled to all the pixels in the same column). The row request line can be for sending a row request to the row receiver 320, while the row acknowledgement line can be for receiving a row acknowledgement from the row receiver 320. Likewise, the column request line can be for sending a column request to the column receiver 320, while the column acknowledgement line can be for receiving a column acknowledgement from the column receiver 320.

The ROIC 300 further has a bias generation circuit 380 for generating bias voltage 385 (e.g., calibrating voltage) and a serial periphery interface circuit 390 (e.g., a Serial Peripheral Interface (SPI) communication link) that communicates with, for example, an off-chip event processor using a protocol controlled with (SPI) program mode 395.

In further detail, in one or more embodiments, the pixels have electromagnetic (such as IR) radiation sensors for sensing triggering amounts of (optical) radiation, such as reflected IR radiation from laser designators. For example, the pixels can be customized to sense only specific frequencies or wavelengths, such as 1064 nm infrared light emitted by Nd:YAG laser designators. When a sufficient level of radiation is incident upon pixels of the array, a pixel triggers, and it sends row and column requests through its corresponding row request and column request lines, which are received by the row receiver 320 and column receiver 330, respectively. It is possible that neighboring pixels (e.g., up to a 2×2 region) may trigger because of the same reflected laser spot. Follow-on event processing can handle the tracking of the same laser spot moving (slowly) across the pixel array 310 (e.g., between adjacent pixels).

In one example, the row request can be sent first. The order is arbitrary; in other embodiments, the column request is sent first or both requests are sent concurrently. The row receiver 320 processes the row requests as they are received. For example, the row receiver 320 can monitor the separate row request lines 325, and process one of the rows when a row request is received from the corresponding row request line. In some embodiments, the row receiver 320 scans the row request lines in round robin fashion, processing the next row that sends a row request. In this manner, the row receiver 320 does not favor one row over another, and processes each row's requests with good temporal correlation. The row receiver 320 can send a row acknowledgement through the corresponding row acknowledgement line. This is received by every pixel in the corresponding row. The row receiver 320 can also send the row address to the sequencer 340, which time stamps the request and processes events for all the triggering pixels in this row with this time stamp. In some embodiments, time stamping is saved until event processing (e.g., off-chip from the ROIC 300). However, this introduces some delay between receipt of the triggering event and the eventual time-stamping of the corresponding events.

At this point, every triggering pixel in the same row that receives the acknowledgement sends their column requests through their corresponding column request lines 335. The column receiver 330 receives these column requests (e.g., by scanning all the column request lines), sending acknowledgements to each of the columns that sent column requests through their corresponding column acknowledgement lines as well as sending the corresponding column addresses to the sequencer 340. The sequencer 340 combines the current row address sent by the row receiver 320 with each of the different column addresses from the column receiver 330 and generates a time-stamped event for each of the different column addresses (and that all share the same row address). When the triggering pixels in the row receive the corresponding column acknowledgements, they reset their sensors and are ready to be triggered again. This clears all the row and column requests from these triggering pixels as well. Processing then resumes with the row receiver 320 scanning for another row that sent a row request.

Because of the row request and column request lines, the ROIC 300 can avoid scanning every pixel; rather, the ROIC 300 can scan entire rows at a time, looking for a row request (that can represent one or more pixels triggering in the corresponding row). This generates the next row address for the sequencer 340, which combines the row address with the corresponding column addresses for the triggering pixels in that row and generates a separate time-stamped event for each one. The sequencer 340 serializes these events 370 and sends them to an event processor (e.g., off chip) to decode patterns of the received IR radiation over time and their corresponding locations in the pixel array 310. The event processor can send these decoded patterns and their locations to a guidance system to control the munition or other payload to its intended target.

For various purposes, such as initializing the pixel array 310, clearing an abnormal condition, or the like, the global reset logic 350 is provided, together with corresponding global reset lines 355. Each global reset line 355 can, for example, reset every pixel in a corresponding column. In another embodiment, the global reset lines 355 are arranged by row. The global resetting can be similar to the local resetting that takes place in each pixel when its corresponding row and column acknowledgements are received.

Figure 4:
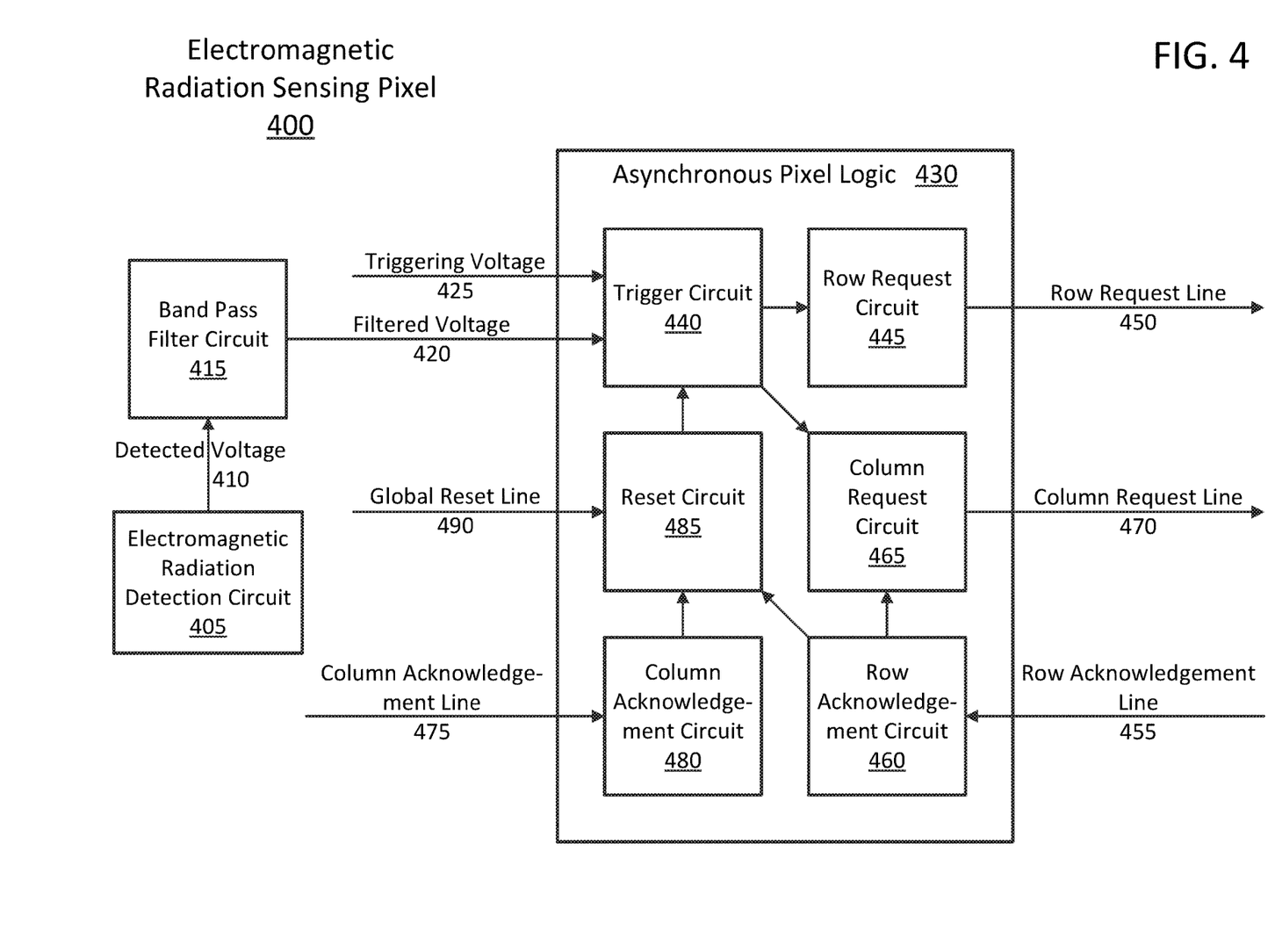
FIG. 4 is a block diagram of an example electromagnetic radiation sensing pixel, according to an embodiment of the present disclosure.

FIG. 4 is a block diagram of an example electromagnetic radiation sensing pixel 400, according to an embodiment of the present disclosure. The sensing pixel 400 includes an electromagnetic radiation detection circuit 405, a filter such as a band pass filter circuit 415, and an asynchronous pixel logic circuit 430. The detection circuit 405 can be, for example, an open circuit photo-diode, which detects light as voltages (e.g., detected voltage 410). The detected voltage 410 from the detection circuit 405 can be input to the band pass filter circuit 415, which filters out detected optical frequencies outside of the intended band (e.g., IR, such as IR wavelengths used for laser designators) and outputs the filtered voltage 420 to the asynchronous pixel logic 430.

The asynchronous pixel logic circuit 430 includes a trigger circuit 440, a row request circuit 445, a row acknowledgement circuit 460, a column request circuit 465, a column acknowledgement circuit 480, and a reset circuit 485. The trigger circuit 440 can include a comparator that compares the filtered voltage 420 from the band pass filter circuit 415 with a triggering voltage 425 (e.g., a tunable voltage that can be calibrated to optimize seeker performance, such as in the particular application or environment in which it is being used). In one example, the trigger voltage is set to be above the noise floor of the array so that the detected signals are the reflected laser signals. According to one embodiment, the trigger voltage is dynamic and can be adjusted by an operator or by the internal processing.

When the comparator determines that the filtered voltage 420 exceeds the triggering voltage 425, the pixel 400 triggers (e.g., goes from a reset state to a triggered state). Once in the triggered state, the trigger circuit 440 lets the row request circuit 445 and the column request circuit 465 know that the pixel 400 has triggered. In response, the row request circuit 445 sends a row request along the row request line 450 (which, for example, joins the request with any other row requests from pixels in the same row). For instance, the row request line 450 can be a simple on/off state (on for one or more pixels in the row have triggered, off for none of the pixels in the row have triggered).

After sending the row request along the row request line 450, the pixel 400 waits for a row acknowledgement along a row acknowledgement line 455. When the row acknowledgement is received by the row acknowledgement circuit 460, the row acknowledgement circuit 460 informs the reset circuit 485 that the row request can be reset and the column request circuit 465 that it is all right to send the column request. The column request circuit 465 responds by sending the column request along the column request line 470. The pixel 400 waits for a column acknowledgement along a column acknowledgement line 475. When the column acknowledgement is received by the column acknowledgement circuit 480, the column acknowledgement circuit 480 informs the reset circuit 485 that the column request can be reset.

In response to the row acknowledgement circuit 460 and the column acknowledgement circuit 480 informing the reset circuit 485 of the row acknowledgement and column acknowledgement, respectively, the reset circuit 485 resets the pixel 400 (e.g., takes the pixel 400 from the triggered state to the reset state). For example, the reset circuit 485 can notify the trigger circuit 440 to reset the sensor and other circuitry that has triggered. In some embodiments, the reset circuit 485 resets the row request and the column request on the row request line 450 and the column request line 470, respectively. In addition, a global reset line 490 can be connected to the reset circuit 485. When the reset circuit 485 receives a global reset along the global reset line 490, the pixel resets in much the same manner as receiving both a row acknowledgement and a column acknowledgement. The global reset line 490 thus provides an efficient mechanism to reset all the pixels concurrently regardless of what states they happen to be in.

Figure 5:
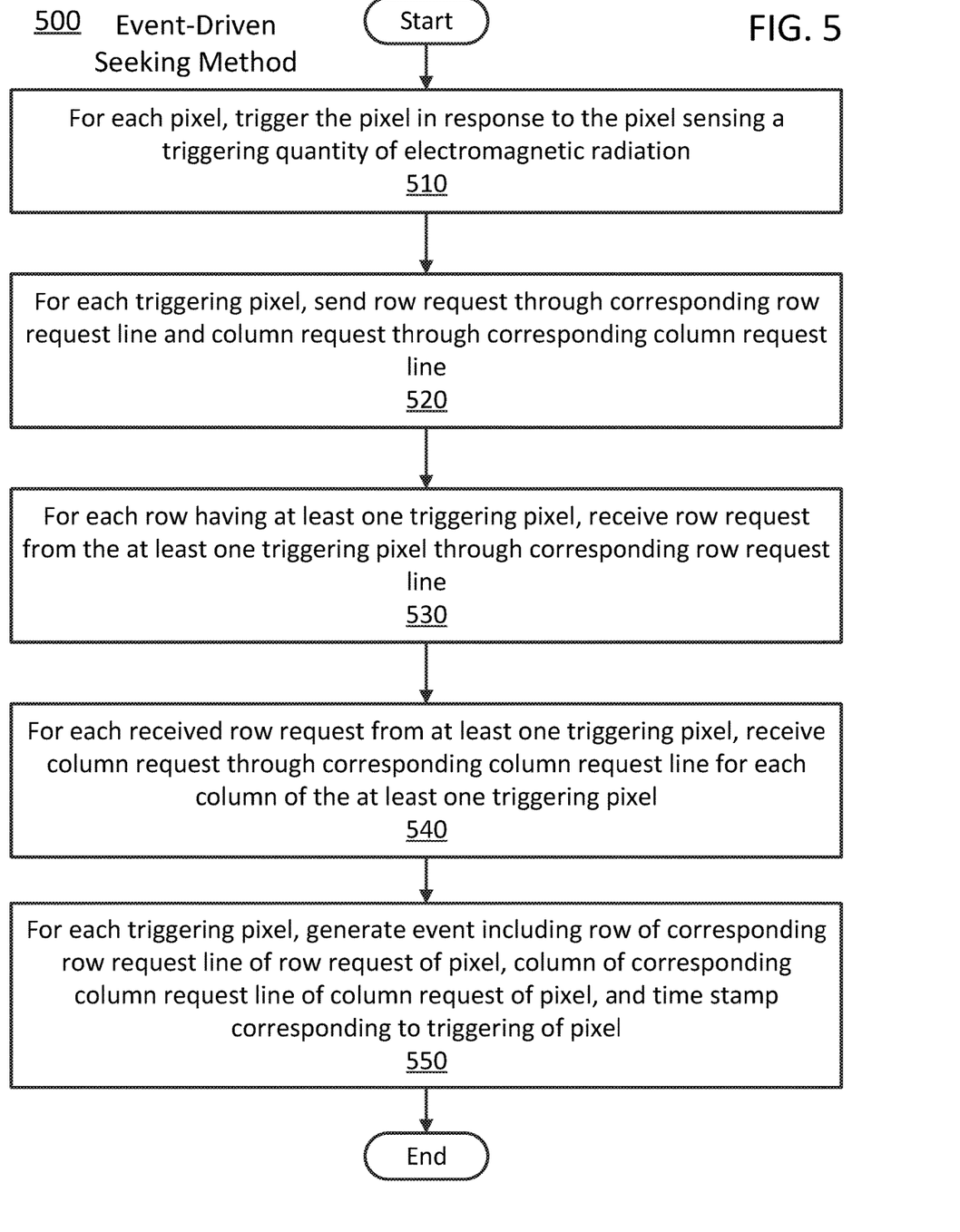
FIG. 5 is a flow diagram of an example event-driven seeking method, according to an embodiment of the present disclosure.

FIG. 5 is a flow diagram of an example event-driven seeking method 500, according to an embodiment of the present disclosure. The method 500 and other methods described herein may be implemented in hardware or combinations of hardware and software. For example, the method 500 may be implemented by the components of FIGS. 1-4. In another embodiment, the method 500 may be implemented be a custom circuit such as a ROIC with custom processing circuits (such as an FPGA) configured to carry out the method 500. In other embodiments, the method 500 may be performed in conjunction with a special purpose processor, such as a signal processor.

In some other embodiments, parts of the method 500 may be implemented as a series of computer instructions, such as software, firmware, or a combination of the two, together with one or more computer processors (e.g., one or more microprocessors). The instructions, when executed on a given processor, cause portions of the method 500 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 500 (or other method described herein) to be carried out for event-driven seeking. In addition, while the methods described herein may appear to have a certain order to their operations, other embodiments may not be so limited. Accordingly, the order of the operations can be varied between embodiments, as would be apparent in light of this disclosure.

In a similar light, the components in FIGS. 1-4 and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

Referring to the method 500 of FIG. 5, a ROIC or other sensing circuit uses a detection array including, for example, at least 2500 sensing pixels (such as a 50×50 array or larger) arranged in a first dimension (e.g., rows) by first request lines (e.g., row request lines) addressed by a first index (e.g., row), and in a second dimension (e.g., columns) by second request lines (e.g., column request lines) addressed by a second index (e.g., column). Processing begins with, for each pixel, triggering 510 the pixel in response to the pixel sensing a triggering quantity of electromagnetic radiation. More than one pixel can trigger at the same time. However, for most processing intervals (e.g., 10 ns or less), very few of the pixels trigger. Processing continues with, for each triggering pixel, sending 520 a row request through the corresponding row request line and a column request through the corresponding column request line. The requests do not have to be concurrent.

Processing continues with receiving 530, for each row having at least one triggering pixel, the row request from the at least one triggering pixel through the corresponding row request line. For instance, more than one pixel can trigger at the same time in the same row (e.g., on the same row request line). Such requests can be combined into one request (e.g., the row request line can supply a simple binary signal indicating one or more pixels on the row have triggered). Processing further includes receiving 540, for each received row request from the at least one triggering pixel, the column request through the corresponding column request line for each column of the at least one triggering pixel. For instance, if more than one pixel triggers in the row, there is a corresponding column request through a corresponding column request line.

Processing continues with, for each triggering pixel, generating 550 an event including the row of the corresponding row request line of the row request of the pixel, the column of the corresponding column request line of the column request of the pixel, and a time stamp corresponding to the time of the triggering of the pixel. A separate event is generated for each triggering pixel. Follow-on event processing includes generating other events sharing the same row and column as the pixel (or nearby pixels, for laser signals that may move or span across more than one pixel), and generating a pattern of electromagnetic radiation emanating from a location corresponding to the same row and column from the generated event and other events.

Further Example Embodiments

The following examples pertain to further embodiments, from which numerous permutations and configurations will be apparent.

Example 1 is a seeker including: a detection array including at least 2500 sensing pixels arranged in rows by row request lines and in columns by column request lines, each pixel including an electromagnetic radiation sensor to trigger the pixel in response to sensing a triggering quantity of electromagnetic radiation, a row request circuit to send a row request through the corresponding row request line after the pixel triggers, and a column request circuit to send a column request through the corresponding column request line after the pixel triggers; a row receiver to receive, for each row having at least one triggering pixel, the row request from the at least one triggering pixel through the corresponding row request line; a column receiver to receive, for each column having one or more triggering pixels, the column request from the one or more triggering pixels through the corresponding column request line; a sequencer to receive, for each triggering pixel, the row of the row request from the row receiver and the column of the column request from the column receiver, and to generate an event including the received row and column of the pixel; and a time stamper to generate a time stamp for each generated event.

Example 2 includes the seeker of Example 1, where for each pixel, the row request circuit sends the row request or the column request circuit sends the column request in response to the pixel triggering.

Example 3 includes the seeker of Example 1, where the pixels are further arranged in the rows by row acknowledgement lines and in the columns by column acknowledgement lines, each pixel further includes a row acknowledgement circuit to receive a row acknowledgement from the corresponding row acknowledgement line after the row request circuit sends the row request, and a column acknowledgement circuit to receive a column acknowledgement from the corresponding column acknowledgement line after the column request circuit sends the column request, the pixel being configured to reset after receiving the row and column acknowledgements, the row receiver is configured to send, for each row having the at least one triggering pixel, the row acknowledgement to the at least one triggering pixel through the corresponding row acknowledgement line after receiving the row request from the at least one triggering pixel through the corresponding row request line, and the column receiver is configured to send, for each column having the one or more triggering pixels, the column acknowledgement to the one or more triggering pixels through the corresponding column acknowledgement line after receiving the column request from the one or more triggering pixels through the corresponding column request line.

Example 4 includes the seeker of Example 3, where for each pixel, the column request circuit sends the column request in response to the row acknowledgement circuit receiving the row acknowledgement, or the row request circuit sends the row request in response to the column acknowledgement circuit receiving the column acknowledgement.

Example 5 includes the seeker of Example 1, further including a processor to receive, for each triggering pixel, the event and other such events sharing the same row and column as the pixel from the sequencer, and to generate a pattern of electromagnetic radiation emanating from a location corresponding to the same row and column from the received event and other such events.

Example 6 includes the seeker of Example 5, where the processor is configured to send the pattern of electromagnetic radiation and the location to a guidance system.

Example 7 includes the seeker of Example 1, further including a global reset line coupled to the pixels, where each pixel is configured to reset after receiving a global reset through the global reset line.

Example 8 is a seeker readout integrated circuit (ROIC) including: a detection array including at least 1250 sensing pixels arranged in a first dimension by first request lines addressed by a first index, and in a second dimension by second request lines addressed by a second index, each pixel including an electromagnetic radiation sensor to trigger the pixel in response to sensing a triggering quantity of electromagnetic radiation, a first request circuit to send a first request through the corresponding first request line in response to the pixel triggering, and a second request circuit to send a second request through the corresponding second request line after the pixel triggers; a first receiver to receive, for each first index having at least one triggering pixel, the first request from the at least one triggering pixel through the corresponding first request line; a second receiver to receive, for each received first request from the at least one triggering pixel, the second request through the corresponding second request line for each second index of the at least one triggering pixel; and a sequencer to receive, for each triggering pixel, the first index of the first request from the first receiver and the second index of the second request from the second receiver, and to generate an event including the received first and second indices of the pixel along with a time stamp of the event.

Example 9 includes the seeker ROIC of Example 8, where the pixels are further arranged in the first dimension by first acknowledgement lines and in the second dimension by second acknowledgement lines, each pixel further includes a first acknowledgement circuit to receive a first acknowledgement from the corresponding first acknowledgement line after the first request circuit sends the first request, and a second acknowledgement circuit to receive a second acknowledgement from the corresponding second acknowledgement line after the second request circuit sends the second request, the pixel resetting in response to receiving the first and second acknowledgements, the first receiver is configured to send, for each received first request from the at least one triggering pixel, the first acknowledgement to the at least one triggering pixel through the corresponding first acknowledgement line, and for each received first request from the at least one triggering pixel, the second receiver is configured to send, for the received second request of each second index of the at least one triggering pixel, the second acknowledgement through the corresponding second acknowledgement line.

Example 10 includes the seeker ROIC of Example 9, where for each pixel, the second request circuit sends the second request through the corresponding second request line in response to the first acknowledgement circuit receiving the first acknowledgement.

Example 11 includes the seeker ROIC of Example 8, where for each first index having the at least one triggering pixel, the second receiver is configured to receive the second request from each of the at least one triggering pixel of the first index before receiving the second request from any of the at least one triggering pixel of another first index.

Example 12 includes the seeker ROIC of Example 8, where the pixels reset in response to receiving a global reset through a global reset line coupled to the pixels.

Example 13 includes the seeker ROIC of Example 8, where the sequencer is further configured to send the generated events to a processor configured to generate a pattern of the sensed electromagnetic radiation over time.

Example 14 is a method of seeking using a detection array including at least 2500 sensing pixels arranged in a first dimension by first request lines addressed by a first index, and in a second dimension by second request lines addressed by a second index, the method including: for each pixel, triggering the pixel in response to the pixel sensing a triggering quantity of electromagnetic radiation; for each triggering pixel, sending a first request through the corresponding first request line and a second request through the corresponding second request line; receiving, for each first index having at least one triggering pixel, the first request from the at least one triggering pixel through the corresponding first request line; receiving, for each received first request from the at least one triggering pixel, the second request through the corresponding second request line for each second index of the at least one triggering pixel; and for each triggering pixel, generating an event including the first index of the corresponding first request line of the first request of the pixel, the second index of the corresponding second request line of the second request of the pixel, and a time stamp corresponding to the time of the triggering of the pixel.

Example 15 includes the method of Example 14, where, for each triggering pixel, the sending of the first request is in response to the pixel triggering.

Example 16 includes the method of Example 14, where the pixels are further arranged in the first dimension by first acknowledgement lines and in the second dimension by second acknowledgement lines, the method further including: for each triggering pixel, receiving a first acknowledgement from the corresponding first acknowledgement line after sending the first request, receiving a second acknowledgement from the corresponding second acknowledgement line after sending the second request, and resetting the pixel after receiving the first and second acknowledgements; sending, for each received first request from the at least one triggering pixel, the first acknowledgement to the at least one triggering pixel through the corresponding first acknowledgement line; and for each received first request from the at least one triggering pixel, sending, for the received second request of each second index of the at least one triggering pixel, the second acknowledgement through the corresponding second acknowledgement line.

Example 17 includes the method of Example 16, where for each triggering pixel, the sending of the second request through the corresponding second request line is in response to the receiving of the first acknowledgement from the corresponding first acknowledgement line.

Example 18 includes the method of Example 14, further including for each triggering pixel: generating other events sharing the same first and second indices as the pixel; and generating a pattern of electromagnetic radiation emanating from a location corresponding to the same first and second indices from the generated event and other events.

Example 19 includes the method of Example 18, further including sending the pattern of electromagnetic radiation and the location to a guidance system.

Example 20 includes the method of Example 14, further including performing a global reset to concurrently reset all the pixels.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A seeker comprising:
a detection array comprising at least 2500 sensing pixels arranged in rows by row request lines and in columns by column request lines, at least one pixel including
an electromagnetic radiation sensor to trigger the pixel in response to sensing a triggering quantity of electromagnetic radiation,
a row request circuit to send a row request through the corresponding row request line after the pixel triggers, and a column request circuit to send a column request through the corresponding column request line after the pixel triggers;

a row receiver to receive, for each row having at least one triggering pixel, the row request from the at least one triggering pixel through the corresponding row request line;

a column receiver to receive, for each column having one or more triggering pixels, the column request from the one or more triggering pixels through the corresponding column request line;

a sequencer to receive, for each triggering pixel, the row of the row request from the row receiver and the column of the column request from the column receiver, and to generate an event comprising the received row and column of the pixel; and a time stamper to generate a time stamp for each generated event.

2. The seeker of claim 1, wherein for the at least one pixel, the row request circuit sends the row request or the column request circuit sends the column request in response to the pixel triggering.

3. The seeker of claim 1, wherein the pixels are further arranged in the rows by row acknowledgement lines and in the columns by column acknowledgement lines, the at least one pixel further includes a row acknowledgement circuit to receive a row acknowledgement from the corresponding row acknowledgement line after the row request circuit sends the row request, and a column acknowledgement circuit to receive a column acknowledgement from the corresponding column acknowledgement line after the column request circuit sends the column request, the pixel being configured to reset after receiving the row and column acknowledgements, the row receiver is configured to send, for each row having the at least one triggering pixel, the row acknowledgement to the at least one triggering pixel through the corresponding row acknowledgement line after receiving the row request from the at least one triggering pixel through the corresponding row request line, and the column receiver is configured to send, for each column having the one or more triggering pixels, the column acknowledgement to the one or more triggering pixels through the corresponding column acknowledgement line after receiving the column request from the one or more triggering pixels through the corresponding column request line.

4. The seeker of claim 3, wherein for the at least one pixel, the column request circuit sends the column request in response to the row acknowledgement circuit receiving the row acknowledgement, or the row request circuit sends the row request in response to the column acknowledgement circuit receiving the column acknowledgement.

5. The seeker of claim 1, further comprising a processor to receive, for each triggering pixel, the event and other such events sharing the same row and column as the pixel from the sequencer, and to generate a pattern of electromagnetic radiation emanating from a location corresponding to the same row and column from the received event and other such events.

6. The seeker of claim 5, wherein the processor is configured to send the pattern of electromagnetic radiation and the location to a guidance system.

7. The seeker of claim 1, further comprising a global reset line coupled to the pixels, wherein the at least one pixel is configured to reset after receiving a global reset through the global reset line.

8. A seeker readout integrated circuit (ROIC) comprising:

a detection array comprising at least 1250 sensing pixels arranged in a first dimension by first request lines addressed by a first index, and in a second dimension by second request lines addressed by a second index, at least one pixel including an electromagnetic radiation sensor to trigger the pixel in response to sensing a triggering quantity of electromagnetic radiation, a first request circuit to send a first request through the corresponding first request line in response to the pixel triggering, and a second request circuit to send a second request through the corresponding second request line after the pixel triggers;

a first receiver to receive, for each first index having at least one triggering pixel, the first request from the at least one triggering pixel through the corresponding first request line;

a second receiver to receive, for each received first request from the at least one triggering pixel, the second request through the corresponding second request line for each second index of the at least one triggering pixel; and a sequencer to receive, for each triggering pixel, the first index of the first request from the first receiver and the second index of the second request from the second receiver, and to generate an event comprising the received first and second indices of the pixel along with a time stamp of the event.

9. The seeker ROIC of claim 8, wherein the pixels are further arranged in the first dimension by first acknowledgement lines and in the second dimension by second acknowledgement lines, the at least one pixel further includes a first acknowledgement circuit to receive a first acknowledgement from the corresponding first acknowledgement line after the first request circuit sends the first request, and a second acknowledgement circuit to receive a second acknowledgement from the corresponding second acknowledgement line after the second request circuit sends the second request, the pixel resetting in response to receiving the first and second acknowledgements, the first receiver is configured to send, for each received first request from the at least one triggering pixel, the first acknowledgement to the at least one triggering pixel through the corresponding first acknowledgement line, and for each received first request from the at least one triggering pixel, the second receiver is configured to send, for the received second request of each second index of the at least one triggering pixel, the second acknowledgement through the corresponding second acknowledgement line.

10. The seeker ROIC of claim 9, wherein for the at least one pixel, the second request circuit sends the second request through the corresponding second request line in response to the first acknowledgement circuit receiving the first acknowledgement.

11. The seeker ROIC of claim 8, wherein for each first index having the at least one triggering pixel, the second receiver is configured to receive the second request from each of the at least one triggering pixel of the first index before receiving the second request from any of the at least one triggering pixel of another first index.

12. The seeker ROIC of claim 8, wherein the pixels reset in response to receiving a global reset through a global reset line coupled to the pixels.

13. The seeker ROIC of claim 8, wherein the sequencer is further configured to send the generated events to a processor configured to generate a pattern of the sensed electromagnetic radiation over time.

14. A method of seeking using a detection array comprising at least 2500 sensing pixels arranged in a first dimension by first request lines addressed by a first index, and in a second dimension by second request lines addressed by a second index, the method comprising:
   for at least one pixel, triggering the pixel in response to the pixel sensing a triggering quantity of electromagnetic radiation;
   for each triggering pixel, sending a first request through the corresponding first request line and a second request through the corresponding second request line;
   receiving, for each first index having at least one triggering pixel, the first request from the at least one triggering pixel through the corresponding first request line;
   receiving, for each received first request from the at least one triggering pixel, the second request through the corresponding second request line for each second index of the at least one triggering pixel; and
   for each triggering pixel, generating an event comprising the first index of the corresponding first request line of the first request of the pixel, the second index of the corresponding second request line of the second request of the pixel, and a time stamp corresponding to the time of the triggering of the pixel.

15. The method of claim 14, wherein, for each triggering pixel, the sending of the first request is in response to the pixel triggering.

16. The method of claim 14, wherein the pixels are further arranged in the first dimension by first acknowledgement lines and in the second dimension by second acknowledgement lines, the method further comprising:
   for each triggering pixel, receiving a first acknowledgement from the corresponding first acknowledgement line after sending the first request, receiving a second acknowledgement from the corresponding second acknowledgement line after sending the second request, and resetting the pixel after receiving the first and second acknowledgements;
   sending, for each received first request from the at least one triggering pixel, the first acknowledgement to the at least one triggering pixel through the corresponding first acknowledgement line; and
   for each received first request from the at least one triggering pixel, sending, for the received second request of each second index of the at least one triggering pixel, the second acknowledgement through the corresponding second acknowledgement line.

17. The method of claim 16, wherein for each triggering pixel, the sending of the second request through the corresponding second request line is in response to the receiving of the first acknowledgement from the corresponding first acknowledgement line.

18. The method of claim 14, further comprising for each triggering pixel:
   generating other events sharing the same first and second indices as the pixel; and
   generating a pattern of electromagnetic radiation emanating from a location corresponding to the same first and second indices from the generated event and other events.

19. The method of claim 18, further comprising sending the pattern of electromagnetic radiation and the location to a guidance system.

20. The method of claim 14, further comprising performing a global reset to concurrently reset all the pixels.

* * * * *